(12) United States Patent
Bang

(10) Patent No.: US 9,167,229 B2
(45) Date of Patent: Oct. 20, 2015

(54) SMALL THREE-DIMENSIONAL IMAGING DEVICE

(75) Inventor: Hyun Cheal Bang, Ansan-si (KR)

(73) Assignee: HYSONIC. CO., LTD. (KR)

( * ) Notice: Subject to any disclaimer, the term of this patent is extended or adjusted under 35 U.S.C. 154(b) by 385 days.

(21) Appl. No.: 13/881,245

(22) PCT Filed: Jun. 23, 2011

(86) PCT No.: PCT/KR2011/004581
§ 371 (c)(1),
(2), (4) Date: Apr. 24, 2013

(87) PCT Pub. No.: WO2012/008695
PCT Pub. Date: Jan. 19, 2012

(65) Prior Publication Data
US 2013/0229496 A1  Sep. 5, 2013

(30) Foreign Application Priority Data
Jul. 16, 2010  (KR) .................. 10-2010-0068945

(51) Int. Cl.
H04N 13/00 (2006.01)
H04N 13/02 (2006.01)
G03B 5/00 (2006.01)
G03B 35/08 (2006.01)

(52) U.S. Cl.
CPC .............. *H04N 13/0203* (2013.01); *G03B 5/00* (2013.01); *G03B 35/08* (2013.01); *H04N 13/0239* (2013.01); *H04N 2213/001* (2013.01)

(58) Field of Classification Search
CPC ................ H04N 13/0239; H04N 13/0203
See application file for complete search history.

(56) References Cited

U.S. PATENT DOCUMENTS

| | | | | |
|---|---|---|---|---|
| 4,751,570 A | * | 6/1988 | Robinson | 348/47 |
| 4,926,257 A | * | 5/1990 | Miyazaki | 348/45 |
| 5,063,441 A | * | 11/1991 | Lipton et al. | 348/47 |
| 5,175,616 A | * | 12/1992 | Milgram et al. | 348/47 |
| 5,495,114 A | * | 2/1996 | Adair | 257/59 |
| 5,699,108 A | * | 12/1997 | Katayama et al. | 348/47 |
| 5,778,268 A | * | 7/1998 | Inaba | 396/326 |
| 6,922,127 B2 | | 7/2005 | Zou et al. | |

(Continued)

FOREIGN PATENT DOCUMENTS

| | | |
|---|---|---|
| JP | 2004117832 | 4/2004 |
| KR | 1020060116095 | 11/2006 |

OTHER PUBLICATIONS

International Search Report—PCT/KR2011/004581 dated Feb. 17, 2012.

*Primary Examiner* — Victor Kostak
(74) *Attorney, Agent, or Firm* — Cantor Colburn LLP

(57) ABSTRACT

The present invention relates to a small three-dimensional imaging device, including a tilt part that is plastically deformed by an external force so as to compensate for tilting between camera modules, and therefore reduces defects in order to improve productivity. The small three-dimensional imaging device of the present invention includes a main member and a camera module. The camera modules includes a first camera module and a second camera module, which are mounted on the top portion of the main member and are space apart from each other to capture a subject image in three dimensions. The main member include a tilt part for tilting the first camera module or the second camera module relative to the other by means of plastic deformation resulting from an external force.

9 Claims, 7 Drawing Sheets

(56) References Cited

U.S. PATENT DOCUMENTS 7,848,635 B2 * 12/2010 Routhier .................. 396/325
8,390,675 B1 * 3/2013 Riederer .................. 348/47
2002/0126458 A1 * 9/2002 Sasaki ..................... 361/735
2008/0225129 A1 * 9/2008 Viinikanoja et al. ...... 348/218.1

* cited by examiner

A-A

SMALL THREE-DIMENSIONAL IMAGING DEVICE

TECHNICAL FIELD

The present invention relates to a small three-dimensional imaging device, and more particularly, to a small three-dimensional imaging device which can take a stereoscopic image using two camera module.

BACKGROUND ART

The application field of mobile communication terminals that typically transmit audio information has been rapidly increasing with recent development of high speed data transmission technology. As a result, it has been a general tendency to transmit still images or moving images using the mobile communication terminals, for example, in on-demand mobile broadcasting service or multi-messaging service and so on.

However, users of the mobile communication terminal are not content with this, and they further require a new terminal which can display a stereoscopic image.

In order to satisfy the users' requirement, there have been proposed a new mobile terminal which can display a 3D image, and a new 3D image photographing apparatus which takes the 3D image.

Typically, in a convention 3D imaging device, two camera modules are mounted on a substrate, and then the stereoscopic image can be obtained using images of an object taken by each camera module.

When the two camera modules are mounted on the substrate, they have to be assembled so that tilting deviation between the two camera modules is located within a desired range. If the tilting deviation between the two assembled camera modules is too large, it was impossible to adjust it and thus the assembly has to be junked.

DISCLOSURE

Technical Problem

An object of the present invention is to provide a small three-dimensional imaging device which includes a tilt part that is plastically deformed by an external force so as to compensate tilting between camera modules and thus reduces defects, thereby improving productivity.

Technical Solution

To achieve the object of the present invention, the present invention can provide a small three-dimensional imaging device, comprising a camera module comprising first and second camera modules for taking a 3D image, which are disposed on a main member 100 so as to be spaced apart from each other, wherein the main member is provided with a tilt part which is plastically deformed by an external force in order to relatively tilt the first camera module or the second camera module.

Preferably, the main member comprises a base part; and the tilt part which is connected with the base part and installed at one or more of the first and second camera modules, and the tilt part comprises a deformation part which is protruded from the base part so as to be plastically deformed by an external force; and a mounting part which is extended from the deformation part and on which the camera module is mounted, and the mounting part is bent toward the base part by the deformation part, or twisted and rotated about the deformation part.

Preferably, the deformation part is protruded from the base part to the same plane thereof and has a smaller width than the base part, and the mounting part is protruded from a distal end of the deformation part in a protruded direction of the deformation part and has a larger width than the deformation part.

Preferably, the deformation part comprises a first deformation part which is protruded from the base part to the same plane thereof and has a smaller width than the base part; a connecting part which is extended from the first deformation part and has a larger width than the first deformation part; and a second deformation part which is protruded from the connecting part in a direction orthogonal to a protruded direction of the first deformation part and integrally connected with the mounting part and has a smaller width than the connecting part.

Preferably, the base part is formed with a first through-hole in which the connecting part is disposed, and the connecting part is formed with a second through-hole in which the mounting part is disposed, and the first through-hole has a larger width than the connecting part, and the second through-hole has a larger width than the mounting part, and the first deformation part is protruded from one side surface of the connecting part toward the base part and integrally connected with the base part, and the second deformation part is protruded from the other side surface of the connecting part toward the mounting part and integrally connected with the mounting part.

Preferably, the first and second deformation parts are respectively provided in two pieces which are disposed to be symmetric with respect to the mounting part, and the connecting part and mounting part are twisted and rotated about first deformation part with respect to the base part, and the mounting part is twisted and rotated about the second deformation part with respect to the connecting part.

Preferably, the main member comprises a base layer formed of a material which can be plastically deformed; an insulating layer which is stacked on the base layer and formed of an insulating material; and a circuitry layer which is stacked on the insulating layer so as to transfer an electric signal to the camera module.

Advantageous Effects

According to the present invention as described above, the small three-dimensional imaging device of the present invention has the effects as follows:

Since the tilt part is plastically deformed by the external force so that the first or second camera module is tilted relatively, the tilting deviation between the first and second camera modules is compensated upon the assembling operation and also the productivity is increased.

And since the mounting part is bent toward the base part by the deformation part, or twisted and rotated about the deformation part, it is possible to adjust the second camera module at various angles, thereby facilely achieving the tilting compensation.

Since the deformation part has the smaller width than the base part and the mounting part, it is minimized that the external force is transmitted to other parts, when the external force is applied to the deformation part, and the deformation part is easily deformed by the external force.

Since the second deformation part is protruded in the direction orthogonal to the protruded direction of the first deformation part, the second deformation part is deformed in the different direction from the first deformation part, and thus it is possible to adjust the second camera module at more various angles, and also it is possible to disperse the external force, thereby reducing the load applied to the first deformation part.

Since first and second deformation parts are respectively provided in two pieces which are disposed to be symmetric with respect to the mounting part, the supporting force of the second camera module is enhanced, thereby preventing bending deformation of the first and second deformation parts due to the weight of the second camera module.

Since the circuitry layer and the insulating layer are stacked on the base layer formed which can be plastically deformed, the main member can be plastically deformed while transferring the electric signal to the camera module.

DESCRIPTION OF DRAWINGS

The above and other objects, features and advantages of the present invention will become apparent from the following description of preferred embodiments given in conjunction with the accompanying drawings, in which.

BEST MODE

Figure 1:
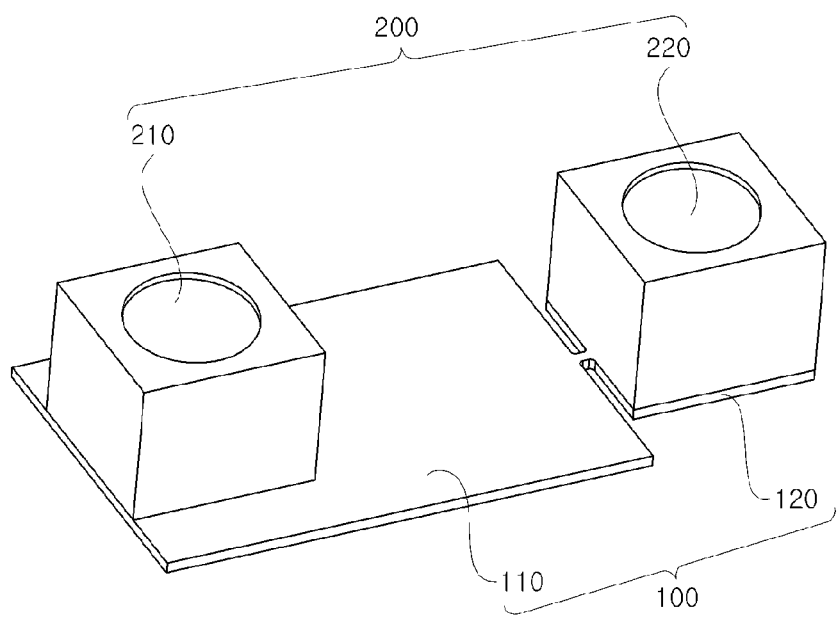
FIG. 1 is a perspective view of a small 3D imaging device according to a first embodiment of the present invention.

Hereinafter, the embodiments of the present invention will be described in detail with reference to accompanying drawings.

As shown in FIGS. 1 to 5, a small 3D imaging device according to the first embodiment of the present invention includes a main member 100 and a camera module 200.

The camera module 200 is composed of a first camera module 210 and a second camera module 220 in order to take a 3D image of an object.

The first and second camera modules 210 and 220 are disposed on the main member 100 so as to be spaced apart from each other in left and right directions.

More detailedly, first and second lenses are respectively disposed at the first and second camera module 210 and 220. The first and second camera module 210 and 220 move the first and second lenses in the left and right directions and thus adjust a vergence angle with respect to an object taken by the first and second lenses.

Of course, if necessary, the first and second lenses may be fixed to the first and second camera modules 210 and 220.

As described above, since the first and second camera modules 210 and 220 are disposed on the main member 100 so as to be spaced apart from each other, it is possible to obtain a stereoscopic 3D image using images of an object taken by the first and second camera modules 210 and 220.

Meanwhile, the main member 100 is formed into a flat plate shape, and the camera module 200 and multiple electronic devices are mounted thereon.

Detailedly, the main member 100 is composed of a base part 110 and a tilt part 120.

The base part 110 is formed into a rectangular thin plate shape on which the first camera module 210 is mounted.

The tilt part 120 is connected with the base part 110, and the second camera module 220 is mounted on the tilt part 120.

The tilt part 120 may be divided into two portions so that the first and second camera modules 210 and 220 can be mounted thereon, respectively. However, in the first embodiment of the present invention, the second camera module 220 is mounted on the tilt part 120 in order to simplify the structure thereof.

More detailedly, the tilt part 120 is composed of a deformation part 121 and a mounting part 122.

Figure 2:
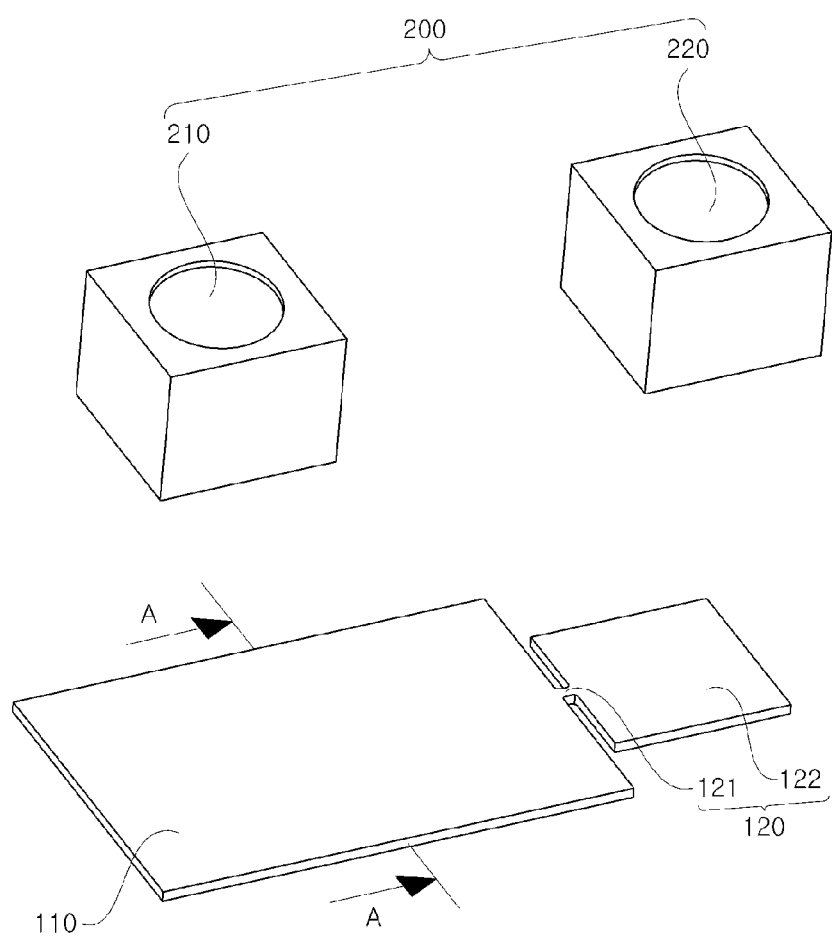
FIG. 2 is an exploded perspective view of the small 3D imaging device according to the first embodiment of the present invention.
Figure 3:
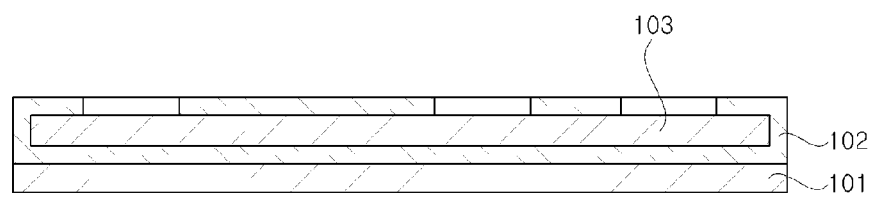
FIG. 3 is a cross-sectional view of a main member according to the first embodiment of the present invention.

As shown in FIG. 2, the deformation part 121 is formed into a square shape so as to be protruded to the same plane of the base part 110, i.e., the right side thereof.

Further, the deformation part 121 has a smaller width than the base part.

The deformation part 121 is plastically deformed by an external force.

The mounting part 122 is formed into a square shape which is extended to the right side of the deformation part 121.

That is, the mounting part 122 is extended from a distal end of the deformation part 121 to the protruded direction of the deformation part 121.

The mounting part 122 has a larger width than the deformation part 121.

As described above, since the mounting part 122 has a smaller width than the base part 110 and mounting part 122, it is minimized that an external force is transmitted to other parts, when the external force is applied to the deformation part 121, and the deformation part 121 is easily deformed by the external force.

And the second camera module 220 is mounted on the mounting part 122.

The mounting part 122 is bent toward the base part 110 by the deformation part 121, or twisted and rotated about the deformation part 121.

Figure 4:
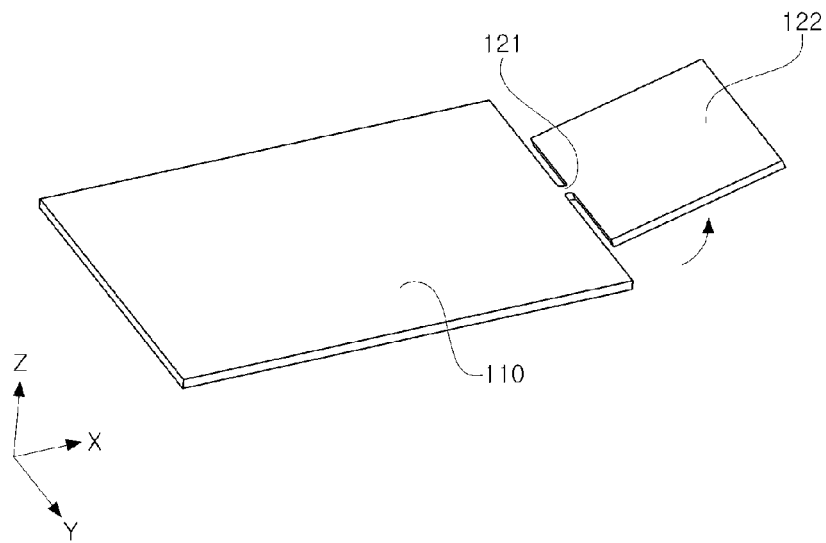
FIGS. 4 and 5 are views showing operation of a deformation part according to the first embodiment of the present invention.
Figure 5:
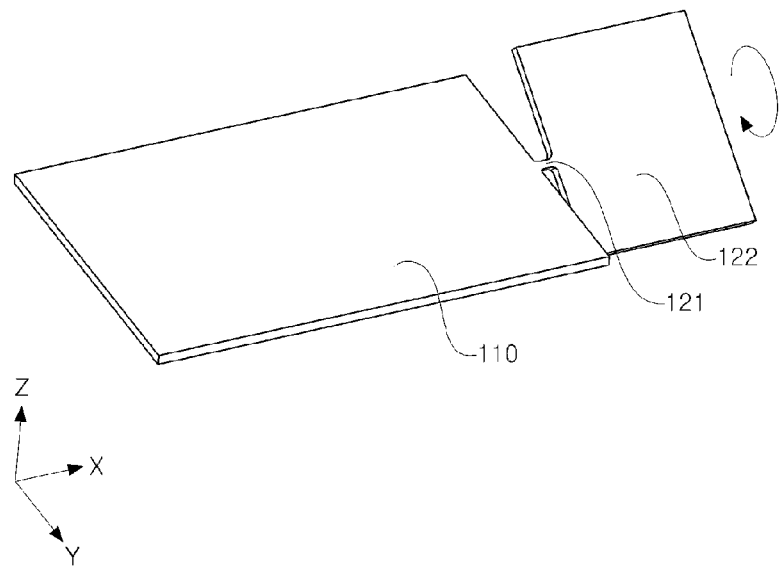
Figure 6:
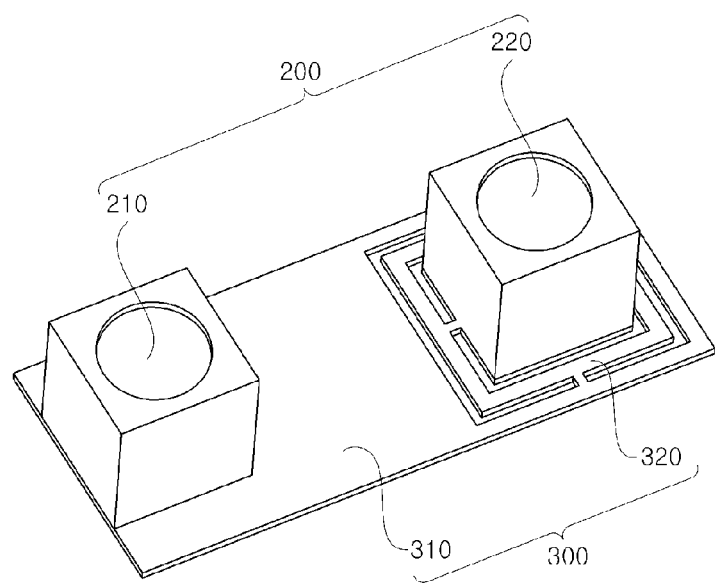
FIG. 6 is a perspective view of a small 3D imaging device according to a second embodiment of the present invention.

And as shown in FIG. 4, the mounting part 122 is bent up and down about a Y-axis by the deformation part 121 so as to compensate Y-axial tilting of the second camera module 220 with respect to the first camera module 210, and also as shown in FIG. 5, twisted up and down and rotated about a X-axis by the deformation part 121 so as to compensate X-axial tilting of the second camera module 220 with respect to the first camera module 210.

As described above, since the mounting part 122 is bent toward the base part 110 or twisted and rotated about the deformation part 121, it is possible to adjust the second camera module 220 at various angles, thereby facilely compensating the tilting compensation.

Further, since the tilt part 120 is plastically deformed so as to relatively tilt the first camera module 210 or the second camera module 220, an angular difference between the first and second camera modules 210 and 220 is compensated and defects of the imaging device is reduced, thereby improving productivity.

Further, the main member 100 includes a base layer 101, an insulating layer 102 and a circuitry layer 103.

The base layer 101 is formed of a material which can be plastically deformed.

Detailedly, the base layer 101 is formed of the material such as steel, aluminum, copper plate and SPCC and formed by press molding, etching or the like.

Moreover, the base layer 101 is plastically deformed by an external force and then maintained in the deformed state when the external force is removed.

The insulating layer 102 is stacked on the base layer 101.

The insulating layer 102 is formed of an insulating material such as a resin material which does not conduct electricity and formed thinly on the base layer 101.

The insulating layer 102 is flexible and thus easily bent by the external force.

The circuitry layer 102 is stacked on the insulating layer 102 and functions to transfer an electric signal to the first and second camera modules 210 and 220.

Detailedly, the circuitry layer 103 is formed of a copper foil material which conducts electricity well and also formed thinly so as to be easily bent by the external force.

Further, the circuitry layer 103 is electrically connected with the camera module 200 in order to allow the exchange of the electric signal between the camera module 200 and the other electronic devices installed at the main member 100.

And part of the circuitry layer 103 is covered by the insulating layer 102.

That is, only the part of the circuitry layer 103, except the rest parts that the camera module 200 and the electronic devices are installed, is covered by the insulating layer 102.

The circuitry layer 103 and the insulating layer 102 are composed of the same construction elements as a FPCB (Flexible Printed Circuits Board). The main body is formed by bonding the FPCB on the base layer 101 using an adhesive or a double-sided tape.

As described above, since the circuitry layer 103 and the insulating layer 102 are stacked on the base layer 101 which can be plastically deformed, the main member 100 can be plastically deformed while transferring the electric signal to the camera module 200.

Hereinafter, a second embodiment of the present invention will be described.

As shown in FIGS. 6 to 9, a small 3D imaging device according to the second embodiment of the present invention includes a main member 300 and a camera module 200.

The camera module 200 in the second embodiment is the same as that in the first embodiment, and thus the description thereof will be omitted.

The main member 300 is formed into a flat plate shape, and the camera module 200 and multiple electronic devices are mounted thereon.

Detailedly, the main member 300 is composed of a base part 310 and a tilt part 320.

The base part 310 is formed into a rectangular thin plate shape on which the first camera module 210 is fixedly mounted.

Further, the base part 310 is formed with a first through-hole 311.

The first through-hole 311 is formed into a square shape of which upper and lower portions are opened. The first through-hole 311 is larger than a width of a connecting part 322 of the tilt part 320 and disposed at the right side of the base part 310, as described later.

The tilt part 320 is disposed in the first through-hole 311, as described later.

The tilt part 320 is connected with the base part 310, and the second camera module 220 is mounted on the tilt part 320.

Of course, the tilt part 320 may be divided into two portions so that the first and second camera modules 210 and 220 can be mounted thereon, respectively. However, in the second embodiment of the present invention, the second camera module 220 is mounted on the tilt part 320 in order to simplify the structure thereof.

More detailedly, the tilt part 320 is composed of a deformation part and a mounting part 325.

The deformation part is formed to be protruded to an inner portion of the first through-hole 311 of the base part 310, and composed of a first deformation part 321, a connecting part 322 and a second deformation part 324.

The first deformation part 321 is formed into a square shape so as to be protruded from one side surface of the connecting part 322 arranged in the first through-hole 311 toward the base part 310 and thus integrally connected with the base part 310, as described later.

That is, the first deformation part 321 is protruded from an inner side of the base part 310 forming the first through-hole 311 to the same plane of the base part 310 and thus integrally connected with the connecting part 322.

And the first deformation part 321 is provided in two pieces which are disposed to be symmetric with respect to the mounting part 325 arranged in the connecting part 322, as described later.

Figure 7:
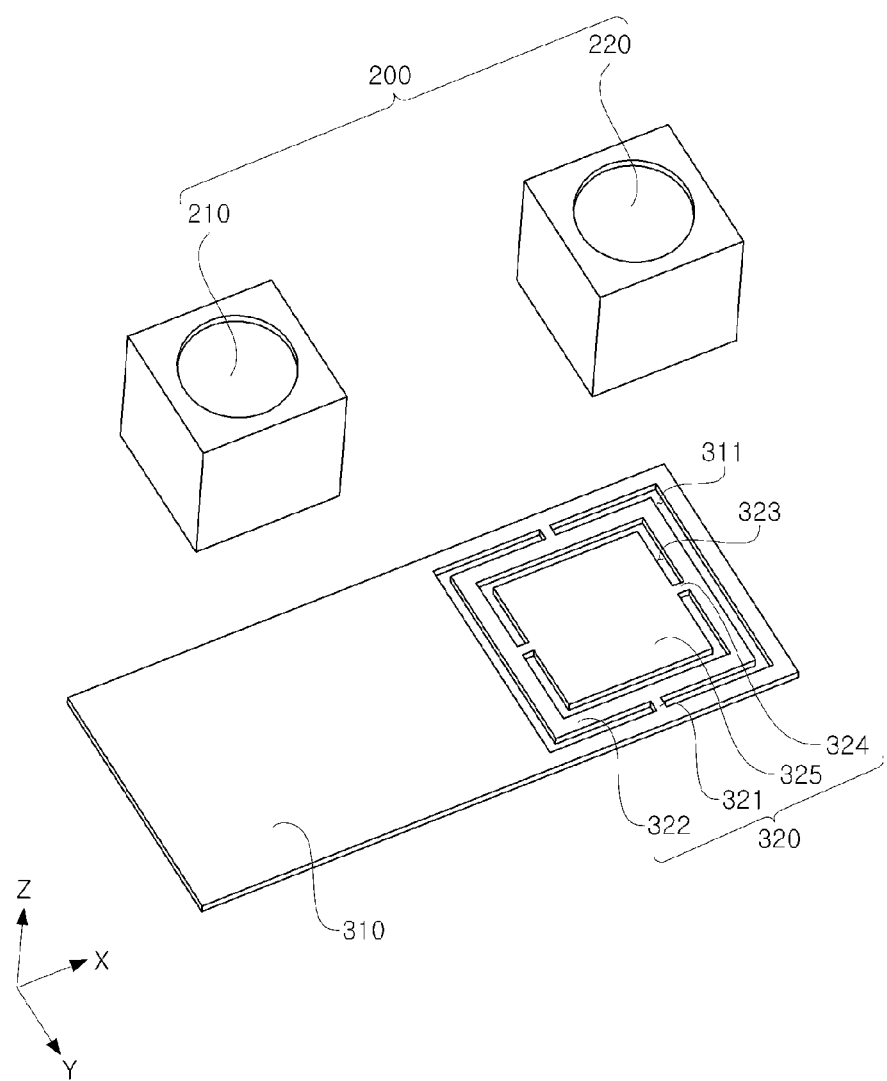
FIG. 7 is an exploded perspective view of the small 3D imaging device according to the second embodiment of the present invention.

That is, as shown in FIG. 7, the first deformation part 321 is formed to be oppositely protruded from the inner side of the base part 310 forming the first through-hole 311 in the Y axial direction.

The first deformation part 321 has a smaller width than the base part 310.

The connecting part 322 is formed into a square shape and disposed in the first through-hole 311 so as to be extended from the first deformation part 321 to the same plane. A width of the connecting part 322 is larger than that of the first deformation part 321 but smaller than that of the first through-hole 311.

Further, the connecting part 322 is formed with a second through-hole 323 in which the mounting part 325 is disposed.

The second through-hole 323 is formed into a square shape of which upper and lower portions are opened. The second through-hole 323 has a larger width than the mounting part 325.

The second deformation part 324 is formed into a square shape and formed to be protruded from the other side surface of the connecting part 322 toward the mounting part 325 and thus integrally connected with the mounting part 325.

That is, the second deformation part 324 is protruded from an inner side of the connecting part 322 forming the second through-hole 323 in a direction orthogonal to the protruded direction of the second deformation part 324 and then connected with the mounting part 325.

And the second deformation part 324 has a smaller width than the connecting part 322.

Further, the second deformation part 324 is provided in two pieces which are disposed to be symmetric with respect to the mounting part 325.

That is, as shown in FIG. 7, the second deformation part 324 is formed to be oppositely protruded from the inner side of the base part 310 forming the second through-hole 323 in the X axial direction.

The mounting part 325 is formed into a square shape so as to be extended from the second deformation part 324 to the same plane thereof, and the second camera module 220 is mounted thereon.

That is, the mounting part 325 is formed to be extended from a distal end of the second deformation part 324 in a protruded direction thereof.

Figure 8:
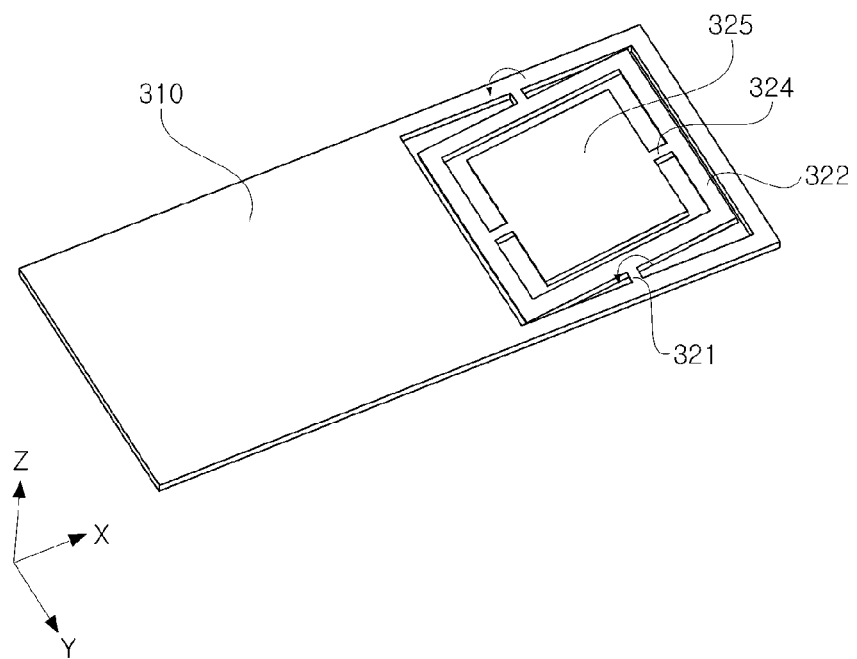
FIGS. 8 and 9 are views showing operation of a deformation part according to the second embodiment of the present invention.
Figure 9:
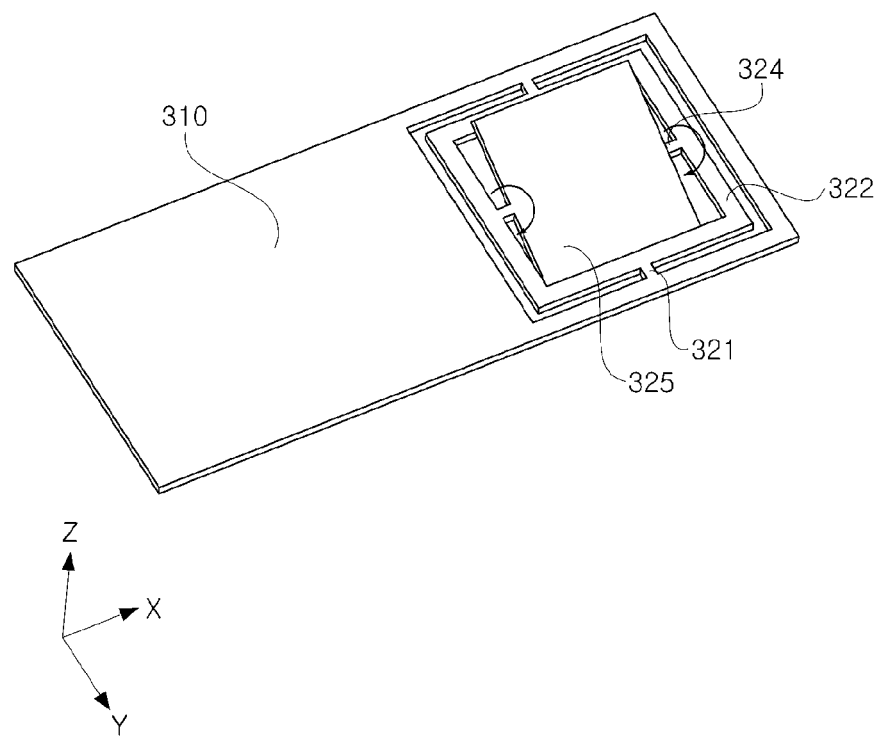

As shown in FIG. 8, the mounting part 325 is twisted together with the connecting part 322 and rotated about the first deformation part 321 with respect to the base part 310, and also as shown in FIG. 9, twisted and rotated about the second deformation part 324 with respect to the connecting part 322.

That is, the connecting part 322 and the mounting part 325 are rotated about the Y axis, and the mounting part 325 is rotated about the X axis.

And when the connecting part 322 and the mounting part 325 are twisted and rotated about the Y axis, the Y-axial tilting of the second camera module 220 with respect to the first camera module 210 is compensated, and when the mounting part 325 is twisted and rotated about the X axis, the X-axial tilting of the second camera module 220 with respect to the first camera module 210 is compensated.

As described above, since the second deformation part 324 is protruded in a direction orthogonal to the protruded direction of the first deformation part 321, the second deformation part 324 is deformed in a different direction from the first deformation part 321, and thus it is possible to adjust the second camera module 220 at more various angles, and also it is possible to disperse the external force, thereby reducing a load applied to the first deformation part 321.

Since the first and second deformation parts 321 and 324 are respectively provided in two pieces which are disposed to be symmetric with respect to the mounting part 325, a supporting force of the second camera module 220 is enhanced, thereby preventing bending deformation of the first and second deformation parts 321 and 324 due to a weight of the second camera module 220.

Further, the main member 300 includes a base layer, an insulating layer and a circuitry layer. However, since they are the same as those in the first embodiment, the description thereof will be omitted.

INDUSTRIAL APPLICABILITY

As described above, the present invention can be applied to the small three-dimensional imaging device, and also includes the tilt part that is plastically deformed by the external force so as to compensate the tilting between the camera modules and thus reduces the defects, thereby improving the productivity.

While the present invention has been described with respect to the specific embodiments, it will be apparent to those skilled in the art that various changes and modifications may be made without departing from the spirit and scope of the invention as defined in the following claims.

The invention claimed is:

1. A three-dimensional imaging device, comprising:
a camera module comprising first and second camera modules for taking a 3D image, which are disposed on a main member so as to be spaced apart from each other,
wherein the main member is provided with a tilt part which is plastically deformed by an external force in order to relatively tilt the first camera module or the second camera module,
wherein the main member comprises a base part; and the tilt part which is connected with the base part and installed at one or more of the first and second camera modules,
the tilt part comprises a deformation part which is protruded from the base part so as to be plastically deformed by an external force; and a mounting part which is extended from the deformation part and on which the camera module is mounted, and
the mounting part is bent toward the base part by the deformation part, or twisted and rotated about the deformation part, and
wherein the deformation part is protruded from the base part to the same plane thereof and has a smaller width than the base part, and the mounting part is protruded from a distal end of the deformation part in a protruded direction of the deformation part and has a larger width than the deformation part.

2. The three-dimensional imaging device according to claim 1, wherein the deformation part comprises a first deformation part which is protruded from the base part to the same plane thereof and has a smaller width than the base part; a connecting part which is extended from the first deformation part and has a larger width than the first deformation part; and a second deformation part which is protruded from the connecting part in a direction orthogonal to a protruded direction of the first deformation part and integrally connected with the mounting part and has a smaller width than the connecting part.

3. The three-dimensional imaging device according to claim 2, wherein the base part is formed with a first through-hole in which the connecting part is disposed, and the connecting part is formed with a second through-hole in which the mounting part is disposed, and the first through-hole has a larger width than the connecting part, and the second through-hole has a larger width than the mounting part, and the first deformation part is protruded from one side surface of the connecting part toward the base part and integrally connected with the base part, and the second deformation part is protruded from the other side surface of the connecting part toward the mounting part and integrally connected with the mounting part.

4. The three-dimensional imaging device according to claim 3, wherein the first and second deformation parts are respectively provided in two pieces which are disposed to be symmetric with respect to the mounting part, and the connecting part and mounting part are twisted and rotated about first deformation part with respect to the base part, and the mounting part is twisted and rotated about the second deformation part with respect to the connecting part.

5. The three-dimensional imaging device according to claim 1, wherein the main member comprises a base layer formed of a material which can be plastically deformed; an insulating layer which is stacked on the base layer and formed of an insulating material; and a circuitry layer which is stacked on the insulating layer so as to transfer an electric signal to the camera module.

6. A three-dimensional imaging device, comprising:
a camera module comprising first and second camera modules for taking a 3D image, which are disposed on a main member so as to be spaced apart from each other,
wherein the main member is provided with a tilt part which is plastically deformed by an external force in order to relatively tilt the first camera module or the second camera module,
wherein the main member comprises a base part; and the tilt part which is connected with the base part and installed at one or more of the first and second camera modules,
the tilt part comprises a deformation part which is protruded from the base part so as to be plastically deformed by an external force; and a mounting part which is extended from the deformation part and on which the camera module is mounted, and the mounting part is bent toward the base part by the deformation part, or twisted and rotated about the deformation part, and wherein the deformation part comprises a first deformation part which is protruded from the base part to the same plane thereof and has a smaller width than the base part; a connecting part which is extended from the first deformation part and has a larger width than the first deformation part; and a second deformation part which is protruded from the connecting part in a direction orthogonal to a protruded direction of the first deformation part and integrally connected with the mounting part and has a smaller width than the connecting part.

7. The three-dimensional imaging device according to claim 6, wherein the base part is formed with a first through-hole in which the connecting part is disposed, and the connecting part is formed with a second through-hole in which the mounting part is disposed, and the first through-hole has a larger width than the connecting part, and the second through-hole has a larger width than the mounting part, and the first deformation part is protruded from one side surface of the connecting part toward the base part and integrally connected with the base part, and the second deformation part is protruded from the other side surface of the connecting part toward the mounting part and integrally connected with the mounting part.

8. The three-dimensional imaging device according to claim 7, wherein the first and second deformation parts are respectively provided in two pieces which are disposed to be symmetric with respect to the mounting part, and the connecting part and mounting part are twisted and rotated about first deformation part with respect to the base part, and the mounting part is twisted and rotated about the second deformation part with respect to the connecting part.

9. The three-dimensional imaging device according to claim 6, wherein the main member comprises a base layer formed of a material which can be plastically deformed; an insulating layer which is stacked on the base layer and formed of an insulating material; and a circuitry layer which is stacked on the insulating layer so as to transfer an electric signal to the camera module.

* * * * *